(12) United States Patent
Amonou et al.

(10) Patent No.: US 8,917,945 B2
(45) Date of Patent: *Dec. 23, 2014

(54) ENCODING AND DECODING AN IMAGE OR IMAGE SEQUENCE DIVIDED INTO PIXEL BLOCKS

(71) Applicant: Orange, Paris (FR)

(72) Inventors: Isabelle Amonou, Cesson-Sevigne (FR); Stephane Pateux, Rennes (FR); Nathalie Cammas, Sens de Bretagne (FR); Sylvain Kervadec, Sens de Bretagne (FR)

(73) Assignee: Orange, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,920

(22) Filed: May 30, 2014

(65) Prior Publication Data

US 2014/0269925 A1  Sep. 18, 2014

Related U.S. Application Data

(63) Continuation of application No. 12/918,963, filed as application No. PCT/FR2009/050278 on Feb. 20, 2009, now Pat. No. 8,787,685.

(30) Foreign Application Priority Data

Feb. 21, 2008 (FR) ..................................... 08 51131

(51) Int. Cl.
  *G06K 9/36* (2006.01)
  *G06K 9/46* (2006.01)
  (Continued)

(52) U.S. Cl.
  CPC ... *H04N 19/00151* (2013.01); *H04N 19/00551* (2013.01); *H04N 19/00369* (2013.01); *H04N*
  (Continued)

(58) Field of Classification Search
  USPC ................ 382/232, 233; 375/240.08, 240.09, 375/240.12, 240.16, 240.24, 240.26, 240.27
  See application file for complete search history.

(56) References Cited

U.S. PATENT DOCUMENTS 5,585,944 A  12/1996  Rodrigiez
6,304,602 B1  10/2001  Yokoyama
(Continued)

FOREIGN PATENT DOCUMENTS

JP  H10-200900 A  7/1998
JP  2007036887 A  2/2007
WO  2004013810 A1  2/2004

OTHER PUBLICATIONS

T. Kanungo et al.: "An Efficient k-means Clustering Algorithm: Analysis and implementation", IEEE Transactions on Pattern Analysis and Machine Intelligence, vol. 24, No. 7, Jul. 2002, 12 pages.

(Continued)

*Primary Examiner* — Samir Ahmed
(74) *Attorney, Agent, or Firm* — David D. Brush; Westman, Champlin & Koehler, P.A.

(57) ABSTRACT

A method and apparatus are provided for coding an image or a sequence of images, generating a data stream including data representative of pixel groups, referred to as blocks, in one of the images. The method includes: grouping blocks in a cluster of blocks according to the proximity of their respective values corresponding to at least one block parameter to be coded; determining a value of the parameter, the value being characteristic of said group of blocks; coding blocks of the cluster, where the values of the blocks for the parameter are coded implicitly by inheritance of the characteristic value or are coded as refinements relative to the characteristic value, and coding a data structure associated with the cluster of blocks, the data structure including data associated with the characteristic value.

17 Claims, 8 Drawing Sheets

(51) Int. Cl.

| | | |
|---|---|---|
| *H04N 19/139* | (2014.01) | |
| *H04N 19/463* | (2014.01) | |
| *H04N 19/196* | (2014.01) | |
| *H04N 19/527* | (2014.01) | |
| *H04N 19/14* | (2014.01) | |
| *H04N 19/17* | (2014.01) | |
| *H04N 19/70* | (2014.01) | |
| *H04N 19/37* | (2014.01) | |
| *H04N 19/176* | (2014.01) | |
| *H04N 19/147* | (2014.01) | |
| *H04N 19/61* | (2014.01) | |
| *H04N 19/20* | (2014.01) | |
| *H04N 19/103* | (2014.01) | |
| *H04N 19/503* | (2014.01) | |
| *H04N 19/177* | (2014.01) | |
| *H04N 19/46* | (2014.01) | |

(52) U.S. Cl.
CPC .............. 19/00593 (2013.01); *H04N 19/00157* (2013.01); *H04N 19/0026* (2013.01); *H04N 19/00884* (2013.01); *H04N 19/00454* (2013.01); *H04N 19/00278* (2013.01); *H04N 19/00175* (2013.01); *H04N 19/00781* (2013.01); *H04N 19/00387* (2013.01); *H04N 19/00018* (2013.01); *H04N 19/00575* (2013.01); *H04N 19/00284* (2013.01); *H04N 19/00545* (2013.01)
USPC ...................................... 382/232; 375/240.16

(56) References Cited

U.S. PATENT DOCUMENTS

| | | | | |
|---|---|---|---|---|
| 6,310,920 | B1 | 10/2001 | Ogawa | |
| 6,421,386 | B1 | 7/2002 | Chung et al. | |
| 6,707,939 | B1 | 3/2004 | Weinholz et al. | |
| 7,085,419 | B2 * | 8/2006 | Akiyoshi et al. | 382/232 |
| 7,095,786 | B1 | 8/2006 | Schonfeld et al. | |
| 7,376,272 | B2 * | 5/2008 | Fan et al. | 382/173 |
| 7,684,630 | B2 * | 3/2010 | Steinberg | 382/243 |
| 7,729,025 | B2 * | 6/2010 | Eguchi et al. | 358/539 |
| 8,260,066 | B2 | 9/2012 | Strom | |
| 2002/0146166 | A1 | 10/2002 | Rao et al. | |
| 2004/0013196 | A1 | 1/2004 | Takagi et al. | |

OTHER PUBLICATIONS

T. Wiegand et al.: "Rate-Constrained Coder Control and Comparison of Video Coding Standards", IEEE Transactions on Circuits and Systems for Video Technology, Jul. 2003, 19 pages.

A. Dumitras and B. Haskell: "An Encoder-Decoder Texture Replacement Method with Application to Content-Based Movie Coding", IEEE Transaction son Circuits and Systems for Video Technology, vol. 14, No. 6, Jun. 2004, 16 pages.

"Advanced Video Coding for Generic Audiovisual Services" International Telecommunications Union, Series H: Audiovisual and Multimedia Systems: Infrastructure of audiovisual services—Coding of moving video, ITU-T Recommendation H.264, Mar. 2005, 343 pages.

"Advanced Video Coding for Generic Audiovisual Services" International Telecommunications Union, Series H: Audiovisual and Multimedia Systems: Infrastructure of audiovisual services—Coding of moving video, ITU-T Recommendation H.264, Nov. 2007, 564 pages.

Notice of Reasons for Rejection and English translation dated Nov. 6, 2012 for Japanese Patent Application No. 2010-547233, 9 pages.

Thomas Meier et al: "Video Segmentation for Content-Based Coding" IEEE Transactions on Circuits and Systems for Video Technology, IEEE Service Center, Piscataway, NJ, US, vol. 9, No. 8, Dec. 1, 1999, XP011014639.

Labit C. et al: "Compact Motion Representation Based on Global Features for Semantic Image Sequence Coding" Visual Communication and Image Processing 1991: Visual Communication, Nov. 11-13, 1991, Boston, Bellingham, WA, US, vol. 1605, Jan. 1, 1991, pp. 697-708, XP000372267.

International Search Report and Written Opinion dated Aug. 25, 2009 for corresponding International Application No. PCT/FR2009/050278, filed Feb. 20, 2009.

Office Action dated Apr. 18, 2013 for corresponding U.S. Appl. No. 12/918,963, filed Aug. 23, 2010.

Final Office Action dated Sep. 23, 2013 for corresponding U.S. Appl. No. 12/918,963, filed Aug. 23, 2010.

Notice of Allowance dated Mar. 5, 2014 for corresponding U.S. Appl. No. 12/918,963, filed Aug. 23, 2010.

International Preliminary Report on Patentability and English translation of the Written Opinion dated Sep. 28, 2010 for corresponding International Application No. PCT/FR2009050278, filed Feb. 20, 2009.

* cited by examiner

ENCODING AND DECODING AN IMAGE OR IMAGE SEQUENCE DIVIDED INTO PIXEL BLOCKS

CROSS-REFERENCE TO RELATED APPLICATIONS

This Application is continuation of and claims priority of U.S. patent application Ser. No. 12/918,963, filed Aug. 23, 2010, the content of which is hereby incorporated by reference in its entirety, which is a Section 371 National Stage Application of International Application No. PCT/FR2009/050278, filed Feb. 20, 2009 and published as WO 2009/112742 on Sep. 17, 2009, not in English, the content of which is hereby incorporated by reference in its entirety.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates generally to the field of image processing and more precisely to coding and decoding digital images and sequences of digital images.

BACKGROUND OF THE DISCLOSURE

Digital images and digital image sequences are known to occupy a great deal of memory space that, when they are transmitted, makes it necessary to compress them in order to avoid the problem of congestion in the communications network used for that transmission, the usable bit rate of the network generally being limited.

Current compressive coding techniques, notably that of the H.264/MPEG-4 AVC (Advanced Video Coding) standard developed by the Joint Video Team (JVT) working group and stemming from the collaboration of the Video Coding Expert Group (VCEG) of the International Telecommunications Union and the Moving Picture Expert Group (MPEG) of the ISO/IEC, described in the document ISO/IEC 14496-10, use techniques of spatial or temporal prediction concerning groups of blocks of pixels referred to as macroblocks of a current image relative to other macroblocks of the same image or a preceding or subsequent image. After such predictive coding, the pixel blocks are processed by applying a discrete cosine transform and then quantized. The coefficients of the quantized pixel blocks are then scanned in a reading order that makes it possible to take advantage of the large number of zero coefficients at high frequencies, and then they are coded entropically.

Those compressive coding techniques are effective, but they are not the optimum for compressing images featuring regions of homogeneous texture. In the H.264/MPEG-4 AVC standard, spatial prediction of a macroblock in an image relative to another macroblock in the same image is possible only if that other macroblock adjoins the macroblock to be predicted in certain predetermined directions relative thereto, generally above and to the left, in a so-called causal vicinity. Similarly, the prediction of the movement vectors of a block or macroblock of an image is a causal prediction relative to the movement vectors of adjoining blocks.

That type of prediction therefore does not make it possible to take advantage of the textural similarity of macroblocks of separate areas with the same texture or of macroblocks that are far apart in an area with the same texture. In other words, that type of technique does not make it possible to address simultaneously as a single entity a group of macroblocks having common characteristics. Moreover, the movement of areas of homogeneous texture from one image to another is not taken advantage of optimally either: the temporal prediction of the H.264/MPEG-4 AVC standard makes it possible to take advantage of the movement of a macroblock from one image to another, but not the fact that the macroblock is part of an area having homogeneous movement.

To solve that problem, so-called regional coding techniques have been proposed that segment the images of a video sequence in such a manner as to isolate areas of homogeneous texture or movement in the images before coding them. Those areas define objects in the images for which a choice is made to use more refined or less refined coding, for example. An example of such a technique is described in the IEEE (Institute of Electrical and Electronics Engineers) paper published in 2004 entitled "An encoder-decoder texture replacement method with application to content-based movie coding" by A. Dumitras et al.

However, those regional coding techniques require sending the decoder that is the destination of the video sequence a segmentation map calculated for each image in the coder that sends the video sequence. The segmentation map is very costly in terms of memory space because its boundaries generally do not correspond to the boundaries of the blocks of pixels of the segmented images. Moreover, the segmentation of a video sequence into regions of arbitrary shape is not deterministic: the boundaries of the segmentation map generally do not correspond to the boundaries of the real objects that the map attempts to subdivide in the images of the video sequence. Because of this, only the representation and transmission of such segmentation maps have been standardized (in the MPEG-4 part 2 standard), not their production.

In conclusion, there are many segmentation techniques and none of them is sufficiently generic for effective segmentation of all kinds of image sequence. Those complex and non-deterministic techniques have therefore never been deployed in industrial coders.

SUMMARY

To this end, the invention proposes a method of coding an image or a sequence of images generating a data stream that includes data representative of pixel groups, referred to as blocks, in one of said images, the method including the steps of:

grouping blocks in a cluster of blocks according to the proximity of their respective values corresponding to at least one block parameter to be coded; and determining a value of said parameter, said value being characteristic of said group of blocks;

the method being characterized in that it includes the step of:

coding blocks of said cluster, where the values of said blocks for said parameter are coded implicitly by inheritance of said characteristic value or are coded as refinements relative to said characteristic value, and coding a data structure associated with said cluster of blocks, said data structure including data associated with said characteristic value.

By means of the invention, data specific to blocks of areas of homogeneous texture, color, or movement is pooled in a manner that is highly flexible compared to the prior art techniques. Where appropriate, grouping blocks into clusters of blocks having a homogeneous texture includes blocks that are far away from one another or are parts of separate areas. Moreover, associating a data structure with each of these clusters also makes it possible to pool block header data. Finally, the invention does not require transmission of a segmentation map to the coder that is the destination of the image or images coded by the coding method of the invention.

Implicit coding by inheriting a value of a parameter for the block concerned means that the inherited value is not coded for that block. On decoding, the characteristic value determined for the cluster is assigned to the parameter of the block concerned.

Coding by refining a value of a parameter for a block means that a refinement value for the value concerned is coded for the block concerned. On decoding, the value that is assigned to the parameter of the block concerned is the characteristic value determined for the cluster plus the refinement value.

According to an advantageous feature, said characteristic value corresponds to the value of a block of said cluster for said parameter to be coded.

In one implementation of the invention, a particular block of the image is used as a data structure associated with a cluster of blocks, which makes it possible to give the cluster the benefit of information on the block, for example the temporal prediction used to code the block when it belongs to an inter image.

According to another advantageous feature, in the block grouping step, at least one sub-block of one of the blocks grouped in this way is not assigned to said cluster of blocks, partitioning information for said block determining the sub-blocks of said block assigned to said cluster being coded in said data structure or in said block during said step of coding blocks of said cluster.

This feature makes it possible to define areas of homogeneous texture or movement precisely: since some sub-blocks are not assigned to the cluster of blocks of which they are part, this cluster in reality groups sub-blocks that define a sharper area than that formed by the blocks of which they are part.

According to another advantageous feature, said cluster of blocks is associated with priority data for decoding blocks of said cluster relative to other blocks or clusters of blocks of said image.

This priority data is sometimes useful for specifying to the decoder an order in which to decode the data associated with the clusters or blocks. For example, if some sub-blocks of a block are not assigned to a group of which the block is part, it may be preferable to decode the sub-blocks of the block assigned to the cluster first. Even if a cluster of blocks is defined as a cluster of a plurality of clusters, it is preferable to decode the data structure associated with that cluster first, before decoding the data structures associated with the clusters included therein.

According to another advantageous feature, when the coding method of the invention is used to code an image sequence, said cluster of blocks is associated with time-to-live data corresponding to a plurality of successive images of said image sequence, said data structure associated with said cluster being coded only once for said successive images.

This time-to-live data makes it possible to pool data common to the clusters from one image to another, which takes advantage of the temporal dimension of the images to be coded, in addition to their spatial dimension.

The invention also provides a method of decoding a data stream representative of an image or a sequence of images, said stream including data representative of pixel groups, referred to as blocks, in one of said images, the method being characterized in that it includes the steps of:
- decoding a data structure associated with a set of said blocks referred to as a cluster of blocks and at least one characteristic associated value corresponding to a block coding parameter; and
- decoding a block of said cluster, assigning to said coding parameter either said characteristic value if said parameter is not coded for said block or a refinement value of said characteristic value calculated from the value corresponding to said coded parameter if said parameter is coded for said block.

According to an advantageous feature, said step of decoding a block is preceded by a step of decoding partitioning information for said block determining the sub-blocks of said macroblock assigned to said cluster of blocks, the sub-blocks of said block not assigned to said cluster being decoded without using said characteristic value.

The invention further provides a signal carrying a data stream representative of an image or a sequence of images, said stream including data representative of pixel groups, referred to as blocks, in one of said images, the signal being characterized in that:
- said stream further includes data representative of a data structure associated with a set of said blocks referred to as a cluster of blocks, said structure including data representative of a characteristic value of said cluster of blocks and corresponding to a block coding parameter; and
- the data representative of a block of said cluster either contains no data representing a value of said coding parameter or contains data representative of a refinement of said characteristic value.

The invention further provides a device for coding an image or a sequence of images generating a data stream including data representative of pixel groups, referred to as blocks, in one of said images, the device including:
- means for grouping blocks into a cluster of blocks according to the proximity of their respective values corresponding to at least one block parameter to be coded; and
- means for determining a characteristic value of said cluster of blocks for said parameter to be coded;
- the device being characterized in that it includes:
- means for coding a data structure associated with said cluster of blocks, said data structure including data associated with said characteristic value; and
- means for coding blocks of said cluster, including:
    - means for implicitly coding values of said blocks for said parameter by inheritance of said characteristic value; and/or
    - means for coding said values as refinements of said characteristic value.

The invention further provides a device for decoding a data stream representing an image or a sequence of images, said stream including data representative of pixel groups, referred to as blocks, in one of said images, the device being characterized in that it includes:
- means for decoding a data structure associated with a set referred to as a cluster of said blocks and at least one characteristic value of said cluster of blocks corresponding to a block coding parameter; and
- means for decoding a block of said cluster, assigning to said coding parameter either said characteristic value if said parameter is not coded for said block or a refinement value of said characteristic value calculated from the value corresponding to said coded parameter if said parameter is coded for said block.

The invention further provides a computer program including instructions for executing any of the methods of the invention when it is executed on a computer.

BRIEF DESCRIPTION OF THE DRAWINGS

Other features and advantages become apparent on reading the following description of preferred implementations given with reference to the following figures, in which.

DETAILED DESCRIPTION OF ILLUSTRATIVE EMBODIMENTS

Three implementations of the invention are described below in which the coding method of the invention is used to code a sequence of images as a bitstream similar to that obtained by coding according to the H.264/MPEG-4 AVC standard. In these implementations, the coding method of the invention is implemented in software or hardware by modifying a coder initially conforming to the H.264/MPEG-4 AVC standard, for example. The coding method of the invention is represented in the form of an algorithm including steps C1 to C3 represented in FIG. 1 that are generic to the three implementations of the invention.

Note that the decoding method of the invention is symmetrically implemented in software or hardware by modifying a decoder initially conforming to the H.264/MPEG-4 AVC standard.

Moreover, as the H.264/MPEG-4 AVC standard subdivides images into macroblocks of pixels corresponding to blocks of pixel blocks, the coding method of these implementations of the invention group macroblocks into clusters. However, the invention can also be used to code or decode an isolated image or any image sequence made up of blocks of pixels. Thus the invention can equally be implemented, for example, by modifying a video coder initially conforming the SVC (Scalable Video Coding) standard, which is an extension of the H.264/MPEG-4 AVC standard currently in process of standardization by the Joint Video Team (JVT).

Figure 2:
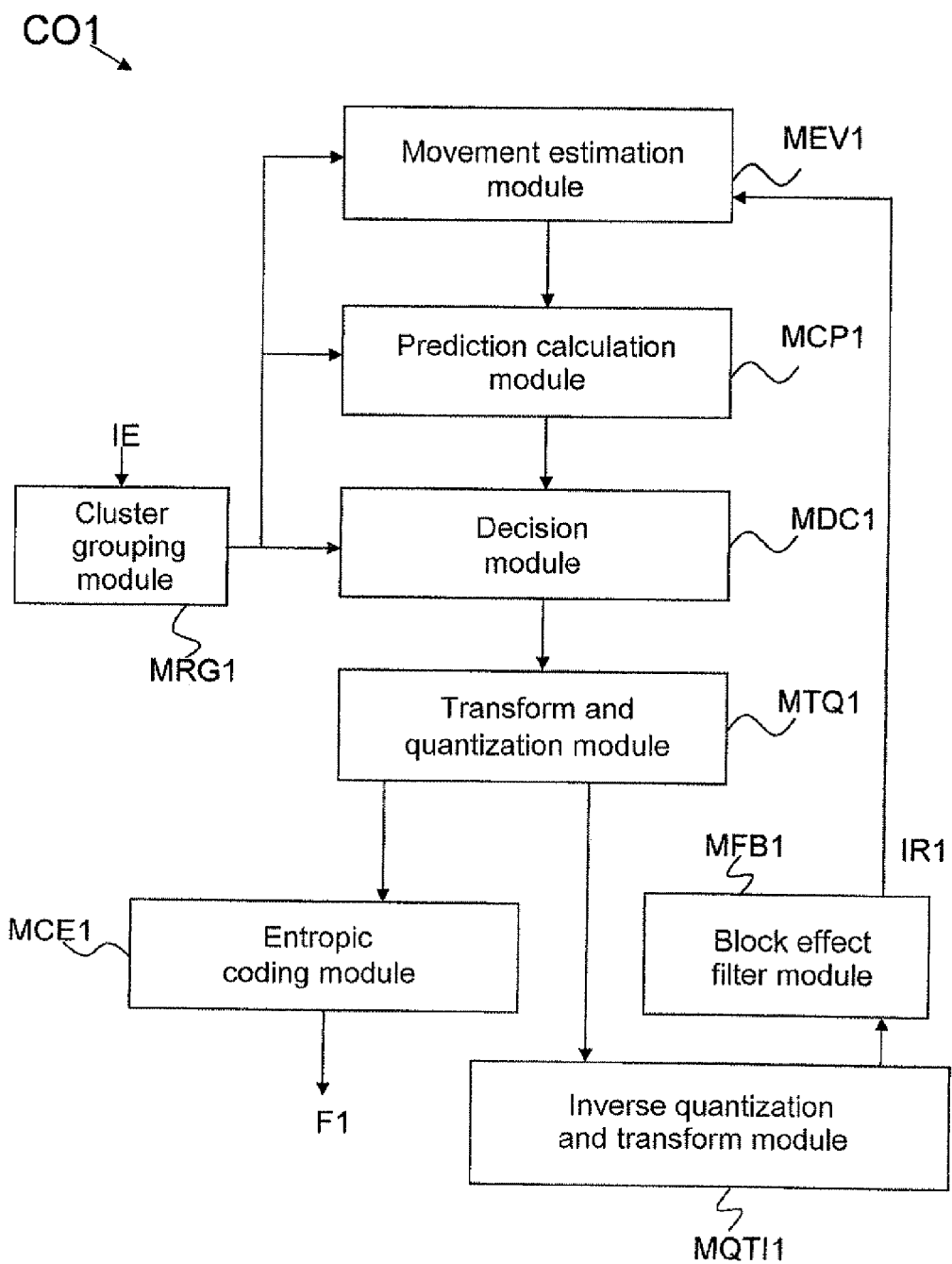
FIG. 2 represents a coding device of a first implementation of the invention.

In a first implementation of the invention, the coding method of the invention is implemented in a coding device CO1 represented in FIG. 2.

Figure 1:
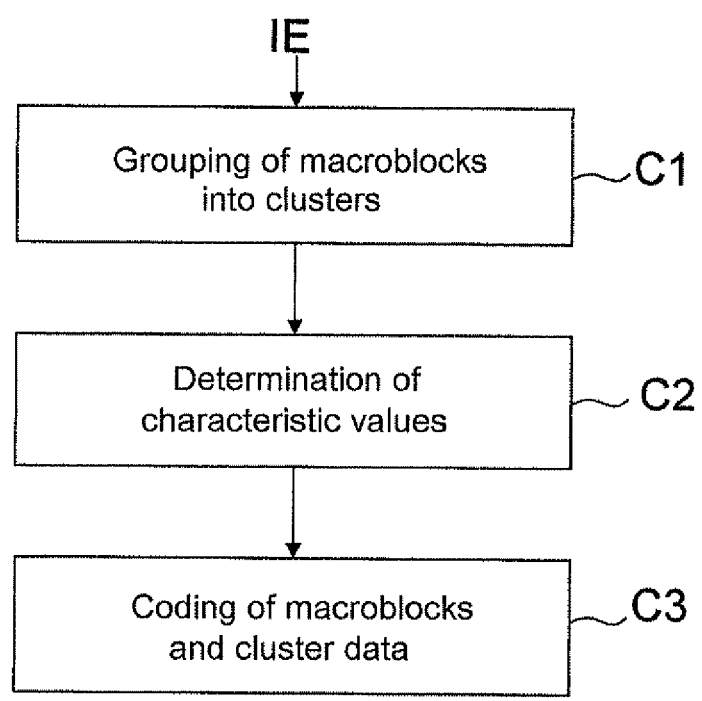
FIG. 1 represents steps of the coding method of the invention.

The first step C1 represented in FIG. 1 groups macroblocks of an image IE from the image sequence to be coded into one or more clusters of macroblocks. For this the image IE is applied to the input of a module MRG1 for grouping macroblocks into clusters shown in FIG. 2.

This cluster grouping module MRG1 uses, for example, a regional growth method known as the k-means clustering method, which uses an algorithm that segments a set of elements into classes of elements by measuring the distance between the features of the elements of the set to be segmented. Such a method is described in the IEEE paper by T. Kanungo et al. published in 2002 entitled "An Efficient k-means Clustering Algorithm: Analysis and Implementation". The cluster grouping module MRG1 thus pre-analyzes the images of the image sequence to be coded before transmitting them, with information defining the clusters of macroblocks defined for each image from the sequence, to the movement estimation module MEV1, the prediction calculation module MCP1, and the decision module MDC1. The operation of these modules is described in detail below.

Figure 3:
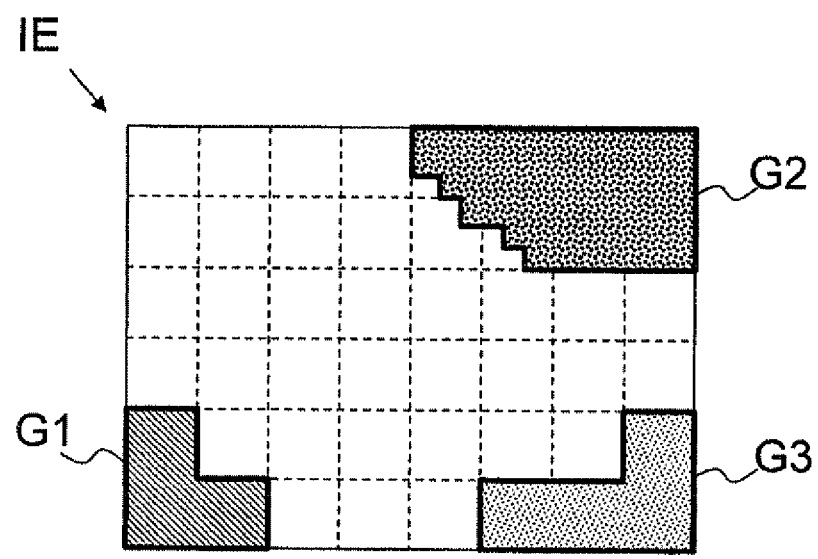
FIG. 3 represents an image coded in accordance with the invention.

Thus in this step C1 the macroblocks of the image IE are grouped into clusters as a function of the similarity of the orientations of their textures, defined in terms of texture contours and gradients, or as a function of the similarity of their colors. Three clusters G1, G2, and G3 are determined in this way, as shown in FIG. 3. The cluster G1 comprises macroblocks with very similar texture and movement, the cluster G2 comprises macroblocks with similar orientations (i.e. the contours that pass through these macroblocks comply with a certain orientation or the texture of these macroblocks is globally oriented in a particular direction) and the cluster G3 groups macroblocks of homogeneous texture.

Note that some blocks of macroblocks of the cluster G2 are not assigned to the cluster G2, which sharpens part of the contour of the cluster G2.

Moreover, in this first implementation, as in the second implementation described below, only texture data is pooled via macroblock cluster data. The third implementation described below is an example of using the invention to pool movement data between macroblocks of a homogeneous movement cluster.

In the next step C2 one or more characteristic values of each of the clusters G1, G2, and G3 determined in the step C1 are determined by the cluster grouping module MRG1, which assigns characteristic texture values to the clusters G1 and G3 and a characteristic texture orientation value to the cluster G2. The texture orientation value assigned to the cluster G2 is, for example, the mean value of the orientations of the contours of each of the macroblocks of the cluster G2. Similarly, the texture values assigned to the clusters G1 and G3 are, for example, the respective mean values of the macroblocks of the cluster G1 and the cluster G3, respectively.

Note that, if a cluster allows it, the module MRG1 may determine a plurality of characteristic values for that cluster. Such a cluster is therefore associated with an mean pixel value and a texture orientation value, for example. It is possible to code a texture in various ways, for example an add-on complementing existing methods in a H.264/MPEG-4 AVC coder:

it is coded in the form of an orientation associated with a color, these two data items making it possible to resynthesize the texture; or it is coded directly in the form of a square of pixels; or only statistical texture values (mean, variance, etc.) are stored, in order to regenerate it in an entirely parametric manner.

The choice between these forms of coding depends on their cost in terms of bit rate, for example.

Note that the term "value" is employed here in the sense of "value of a parameter" and therefore may designate a plurality of values as a function of that parameter. In this implementation, for macroblock coding parameters other than those present in the headers of the macroblock data, see those defined in the H.264/MPEG-4 AVC standard, for example. As a function of the coding option chosen, a macroblock texture value corresponds to three squares or matrices of values, for example, i.e. a luminance value square and two chrominance value squares.

At the end of the step C2, the cluster grouping module MRG1 transmits the image IE and the information defining the clusters G1, G2, and G3 to the prediction calculation module MCP1 and the decision module MDC1. The information defining one of the clusters G1, G2, or G3 is as follows:

the index of the macroblocks grouped in this cluster;
the characteristic value or values assigned to this cluster in the step C2, such as a characteristic texture orientation value;
for each macroblock of this cluster for which one or more blocks or sub-blocks are not assigned to the cluster, partitioning information defining the blocks and sub-blocks of the macroblock that are assigned to this cluster;
if this cluster is present in a plurality of consecutive images, where appropriate cluster time-to-live data, for example equal to the remaining number of images with which the cluster is concerned, as well as data for updating the index of the macroblocks of this cluster relative to the preceding image, where appropriate partitioning information associated with the updated macroblocks, if these macroblocks contain blocks or sub-blocks not assigned to this cluster, and information for updating characteristic values of the cluster relative to those assigned to it in a preceding image;
decoding priority data if the cluster must be decoded before or after other clusters of macroblocks, or before or after the macroblocks that are not assigned to clusters, referred to as "free" macroblocks.

The next step C3 codes the characteristic values determined in the step C2 in data structures associated with each of the clusters G1, G2, and G3 and codes the macroblocks of the image IE.

When coding a cluster, if a time-to-live is associated with it, the prediction calculation module MCP1 where appropriate calculates the difference between the characteristic values assigned to the cluster in the step C2 for the image IE and the characteristic values assigned to the cluster in the step C2 for the preceding image. Thus only characteristic value temporal prediction residues (updating information) are coded from one image to another for this cluster, except for the first image in which this cluster appears, of course. Alternatively, if a time-to-live is associated with the cluster, no characteristic value is coded for the images following the first image in which this cluster appears (there is no updating of characteristic values). In this variant, the decoder of the invention always re-uses the same characteristic values of the cluster, i.e. those received for the first image in which the cluster appears.

The decision module MDC1 codes the characteristic values of a cluster or the predictions of those characteristic values in a similar manner to coding the corresponding values of an H.264/MPEG-4 AVC format macroblock.

Figure 4:
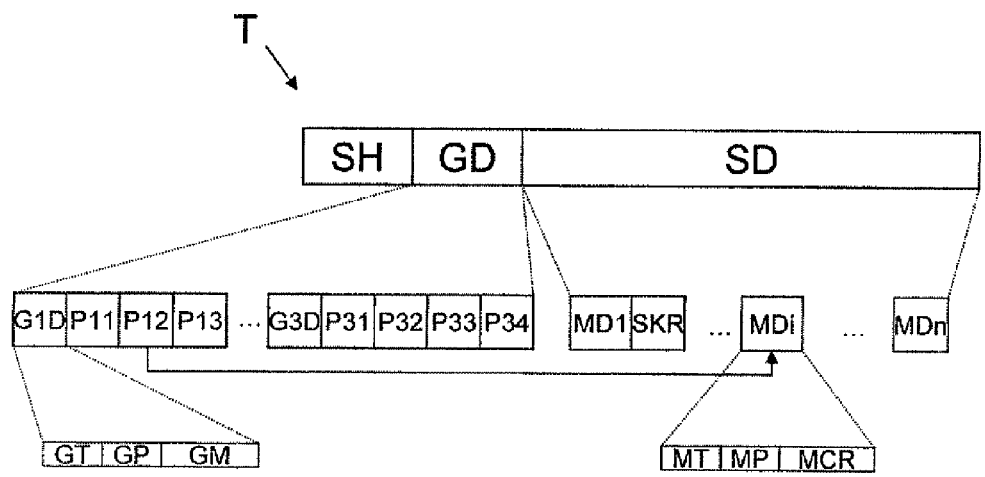
FIG. 4 represents one way of coding macroblocks of an image coded in accordance with the invention.

FIG. 4 shows a slice T of macroblocks of the image IE coded in accordance with a variant of the invention. Compared to the H.264/MPEG-4 AVC format, a field GD coding data specific to the clusters of macroblocks of the slice is inserted between the slice header data field SH and the macroblock data field SD.

This field GD codes the data structures associated with each cluster in which the characteristic values of these clusters are coded. In this implementation, their syntax is similar to the H.264 syntax. Thus the data structure associated with the cluster G1 comprises data G1D and pointers P11, P12, and P13 each of which points to a macroblock of the cluster G1. The data G1D comprises:

a field GT specifying a type of coding for the cluster, for example intra coding or inter coding;
a field GP indicating the type of prediction used to code the characteristic values of the cluster (no prediction or the position of the prediction values); and
a field GM containing the coding of the characteristic value or values of the group, where applicable predicted, and possibly a time-to-live associated with the cluster, decoding priority data.

The time-to-live associated with a cluster is alternatively coded implicitly, for example if that time-to-live is equal to the duration of a group of pictures (GOP).

The field GD also contains the data of the clusters G2 and G3, the data of the cluster G3 being represented in FIG. 4 by a data field G3D followed by pointers P31, P32, P33, and P34 pointing to the macroblocks of the cluster G3.

When a pointer relates to a macroblock of which only some blocks are not assigned to a cluster, for example one of the pointers of the cluster G2, this pointer is coded in a data structure including macroblock partitioning data. This partitioning data is explained below.

Note that the slice T generally corresponds to the entire image IE. For example, if the macroblock slices used each contain only part of the image IE, an FMO (Flexible Macroblock Ordering) mechanism is used to group the data of a cluster and the data of macroblocks associated with that cluster in the same macroblock slice.

Figure 5:
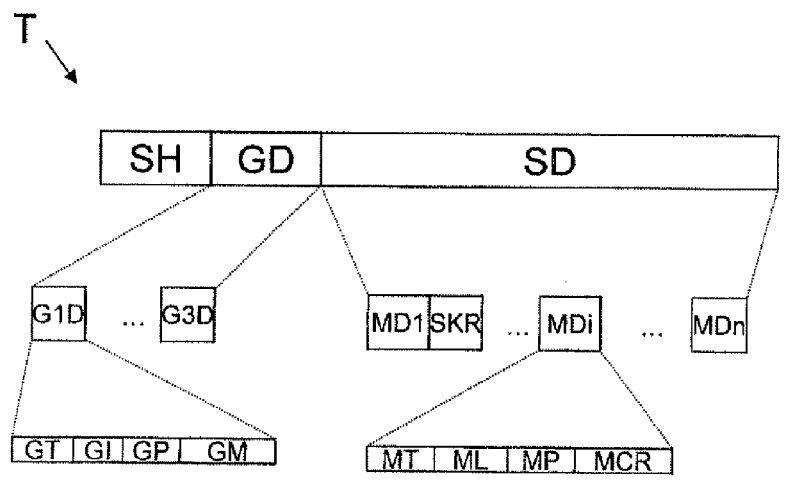
FIG. 5 represents another way of coding macroblocks of an image coded in accordance with the invention.

FIG. 5 shows the macroblock slice T coded by another variant of the invention. Compared to the FIG. 4 variant, the data G1D further includes a cluster index field GI and the data structures associated with each of the clusters do not contain pointers to the macroblocks of those clusters. That a macroblock belongs to a cluster is indicated otherwise, using a coded field ML in each macroblock that includes one or more cluster indices, as described in detail below with reference to the macroblock coding step C3. Because of this, in this coding variant the cluster data GD for a given cluster does not contain data for updating macroblocks grouped in the cluster or decoding priority data.

Note that these two coding variants make it possible for the same macroblock to be part of a plurality of clusters. Accordingly, this macroblock inherits, for example, a characteristic value from a first cluster and another characteristic value from another cluster.

Moreover, the priority data associated with some clusters makes it possible to "connect" those clusters: for example, if characteristic values of one cluster are used to predict characteristic values of another cluster, the priority data is used to indicate to the decoder that it is necessary to decode the reference cluster first and then the other cluster predicted from that reference cluster.

The macroblocks of the image IE are also coded in this step C3. As under the H.264/MPEG-4 AVC standard, the prediction calculation module MCP1 calculates various possible predictions of the macroblocks of the image IE. These predictions are calculated from the image IE or from other images of the sequence previously coded and then decoded and inserted into a list of reference images IR1. These reference images IR1 are constructed from the initial images of the image sequence to be coded in accordance with the H.264/MPEG-4 AVC standard:

- discrete cosine transform and quantization coding is effected by the transform and quantization module MTQ1;
- inverse discrete cosine transform and inverse quantization decoding is then effected by the inverse quantization and transform module MTQI1; and
- finally, a block effect filter module MFB1 reduces block effects in images coded in this way and decoded to provide at the output the reference images IR1.

The predictions calculated by the prediction calculation module MCP1 depend on which type of image the image IE is:

- if the image IE is an intra image, i.e. one coded without temporal prediction relative to macroblocks of other senders of the sequence to be coded, the prediction calculation module MCP1 calculates possible spatial predictions of each macroblock of the image IE relative to other macroblocks of the image IE; and
- if the image IE is an inter image, i.e. one for which it is possible to code a macroblock by temporal prediction relative to macroblocks of other images from the sequence to be coded, then the module MEV1 calculates movements between the image IE and one or more reference images IR1. The prediction calculation module MCP1 then calculates possible temporal predictions of each macroblock of the image IE relative to macroblocks of other images from the sequence to be coded and also possible spatial predictions of each macroblock of the image IE relative to other macroblocks of the image IE.

In addition to the temporal and spatial predictions provided for by the H.264/MPEG-4 AVC standard, the prediction calculation module MCP1 calculates for the macroblocks of the image IE in a cluster the differences between the characteristic values of that cluster and the corresponding values of those macroblocks.

Once the prediction calculation module MCP1 has calculated the possible predictions, the decision module MDC1 scans the macroblocks of the image IE and, in this step C3, chooses the type of prediction used to code each of these macroblocks. From the possible predictions for a macroblock, the decision module MDC1 chooses either the optimum prediction according to a bit rate vs. distortion criterion or not to use any prediction if the bit rate vs. distortion criterion for the "no prediction" option is better than all possible predictions. A usable bit rate vs. distortion criterion is described in the IEEE paper by T. Wiegang et al. published in July 2003 entitled "Rate-Constrained Coder Control and Comparison of Video Coding Standards".

If the macroblock scanned by the decision module MDC1 is a free macroblock, i.e. does not belong to any cluster, the decision module MDC1 codes that macroblock according to a spatial or temporal prediction or with no prediction, depending on the type (inter or intra) of the image IE and possible optimization of the bit rate vs. distortion criterion.

In contrast, if the macroblock scanned by the decision module MDC1 is a macroblock of a cluster, the decision module MDC1 codes that macroblock either using the data of that cluster or in the same way as for a free macroblock, as a function of the choice that optimizes the bit rate vs. distortion criterion.

Note that when a macroblock of a cluster is coded like a free macroblock, in the FIG. 4 coding variant the data of that cluster contains no pointer to the macroblock. This is why cluster data is coded at the same time as coding macroblocks of the cluster. In other words, syntax production of the slice T takes place after all the coding choices for that slice have been finalized, for both cluster data and for macroblock data.

The macroblocks of the image IE are coded in macroblock slices in accordance with one of the variants represented in FIGS. 4 and 5. For the slice T, for example, each macroblock is coded in a field MDi of the fields MD1 to MDn in the field SD reserved for macroblock data. The field SKR represents a macroblock coded in accordance with the skip_run mode of the H.264/MPEG-4 AVC standard.

In the FIG. 4 variant, free macroblocks are coded as in the H.264/MPEG-4 AVC standard: each includes a field MT specifying the type (inter or intra) of the macroblock concerned, a field MP indicating the prediction direction used (spatial for intra macroblocks, movement vectors for inter macroblocks), and a field MCR coding the values of the macroblock residues. In contrast, for a macroblock of a cluster:

- the field MT is not present;
- the field MP is present to indicate the mode of prediction of the values of the corresponding macroblock corresponding to parameters other than those corresponding to the characteristic values of the cluster; and
- the field MCR is present if a residue is coded to refine the data inherited from the cluster.

In the FIG. 5 variant, free macroblocks are also coded as in the H.264/MPEG-4 AVC standard, but the macroblocks of a cluster have a new macroblock type, for example MB_CLUSTER, coded in the field MT and indicating that they belong to a cluster. If a macroblock is of the MB_CLUSTER type, it also has a new header field ML including one or more cluster indices to indicate the cluster or clusters of which it is part.

Other coding variants may of course be envisaged. For example, in another coding variant, macroblocks are coded in the same way as in the FIG. 5 variant except that the header field ML is a simple flag having the value 0 or 1 according to whether the macroblocks are in a cluster or not. Note nevertheless that this other variant does not make it possible for a macroblock to be part of a plurality of clusters.

Moreover, in these variants, the field MCR of a macroblock using the data of a cluster is coded as follows:

- the values of the coding parameters of the macroblock that do not have corresponding values in the data of the cluster to which it belongs are coded in a similar manner to AVC coding using the prediction mode indicated in the field MP; and
- the values of the coding parameters of the macroblock that do have corresponding values in the data of the cluster to which it belongs are not coded, or only the differences between the characteristic values of the cluster and the corresponding values of the macroblock are coded; for example, the choice between coding nothing for these values or coding only refinement values is made according to a bit rate vs. distortion criterion between these characteristic values and the corresponding values of the macroblock.

Thus the frame T includes macroblocks some parameter values of which are not coded explicitly but implicitly by inheriting characteristic values coded in the cluster data GD.

If only some blocks of a macroblock are not part of a cluster, the positioning information associated with the macroblock indicates the subdivision of the macroblock, making it possible to determine which blocks are assigned to the cluster, the other blocks, thereafter referred to as "free" blocks, not being assigned to it. For example, in the FIG. 5 variant, this subdivision is coded by a flag associated with each block of the macroblock and indicating whether the block is free or not. Blocks assigned to the cluster are coded in a similar manner to coding a macroblock entirely assigned to the cluster, i.e. for the parameters corresponding to the characteristic values of the cluster the values of these blocks inherit or refine these characteristic values. The partitioning information indicates for each free block the AVC prediction type used. Moreover, the default vicinity used to determine prediction directions is modified, with the result that the free blocks do not use the blocks of the macroblock that are part of the cluster.

When this structural coding has been effected by the decision module MDC1, any residue coefficients that correspond to the blocks of the image IE are sent to the transform and quantization module MTQ1 that applies a discrete cosine transform followed by quantization. The macroblock slices with these quantized coefficients are then sent to the entropic coding module MCE1 to produce, with other images of the video sequence already coded in the same way as the image IE, a video bitstream F1 coded in accordance with the invention.

Figure 6:
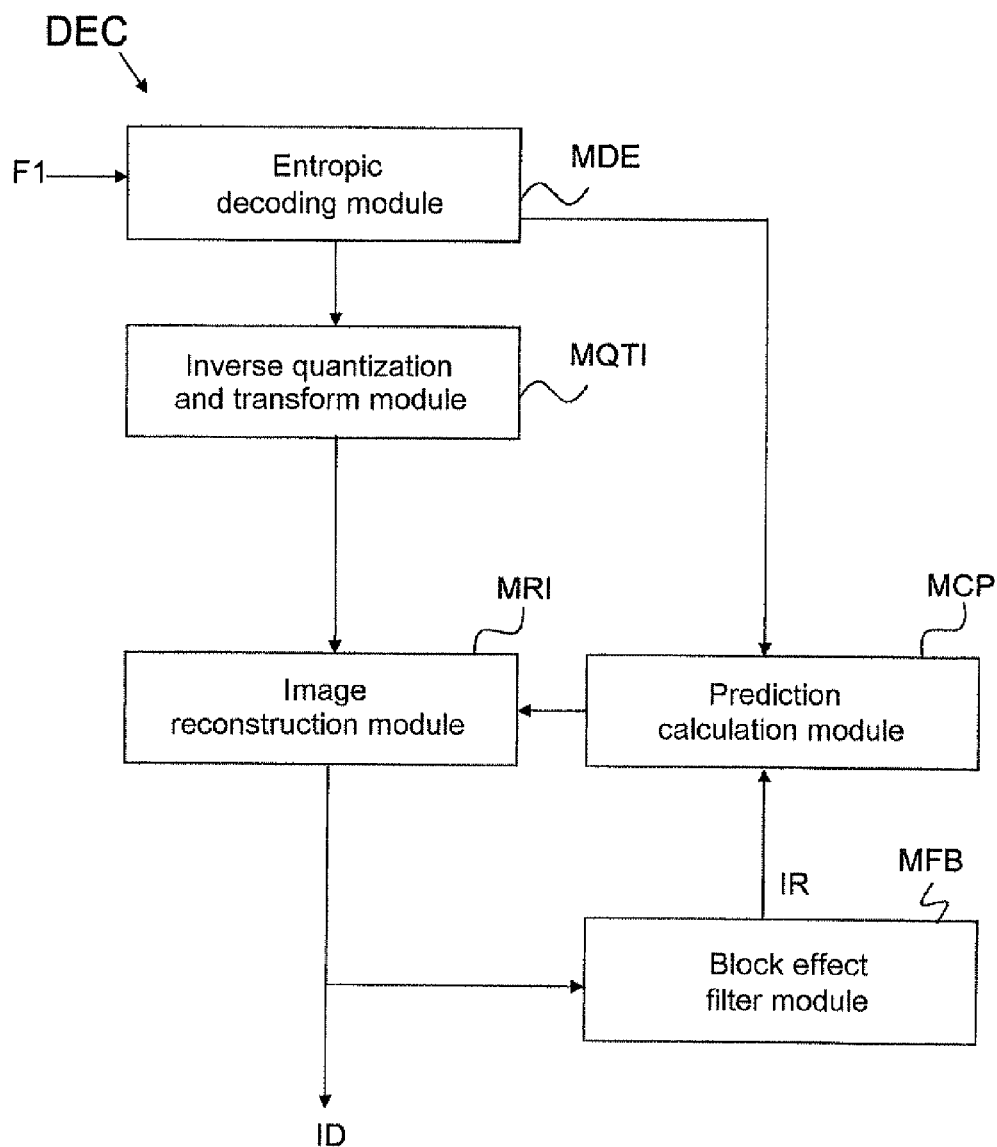
FIG. 6 represents a decoding device of the invention.

The bitstream F1 coded in this way is sent via a communications network to a remote terminal that includes a decoder DEC of the invention represented in FIG. 6.

The bitstream F1 is first sent to the entropic decoder module MDE, which effects decoding that is the inverse of the coding effected by the module MCE1. For each image block to be reconstructed, any coefficients decoded by the module MDE are sent to the inverse quantization and inverse transform module MQTI.

Figure 7:
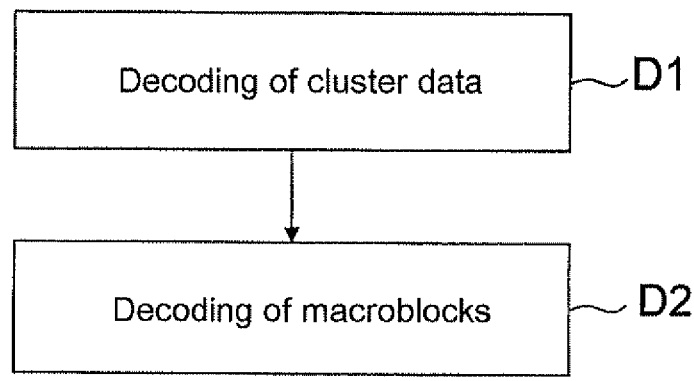
FIG. 7 represents steps of the decoding method of the invention.

In the step C3 of coding in accordance with the invention, the image reconstruction module MRI then receives decoded data corresponding to the data produced by the module MDC1, ignoring transmission errors. The module MRI executes the steps D1 and D2 of the decoding method of the invention represented in FIG. 7. Symmetrically relative to the coding method of the invention, these steps are generic to the three implementations of the invention.

The first step D1 decodes data structures of clusters coded in the macroblock slices of the image IE. The module MRI verifies by means of the header field GP of the data of a given cluster whether or not a temporal prediction was used to code the data of that cluster.

If a prediction has been used relative to a preceding image of the stream F1 or part of the current image, the module MRI uses prediction values supplied by the prediction calculation module MCP shown in FIG. 6 to decode the characteristic values of the cluster. The module MCP receives:
  reference images IR from the image sequence to be decoded corresponding to images from the sequence previously reconstructed by the reconstruction module MRI and filtered by the module MFB to reduce block effects caused by decoding; and
  the characteristic values of the clusters previously decoded and held in its memory by the reconstruction module MRI.

The prediction values for each characteristic value of the cluster are then added to the values decoded by the module MQTI.

If the field GP of the cluster does not indicate temporal prediction, the values decoded by the module MQTI are used as they stand as characteristic values of the cluster.

Once the characteristic values of each cluster of the image IE have been decoded, if the image IE was coded according to the FIG. 4 variant, the module MRI draws up for each cluster of the image IE a list of the macroblocks associated with that cluster and where applicable of the blocks individually assigned to that cluster if some blocks are partitioned.

As explained with reference to the coding method of the invention, some clusters having a time-to-live spanning a plurality of images and coded in accordance with the FIG. 4 coding variant contain data for updating the macroblocks of each of these clusters. In this situation the module MRI draws up a list of macroblocks associated with such a cluster, applying the updating data included in this cluster to a list drawn up for the preceding image and held in a memory of the module MRI.

When the lists of macroblocks and blocks of the clusters of the image IE have been drawn up, if the data associated with those clusters contains decoding priority data indicating a decoding priority of one cluster relative to another cluster or to the free macroblocks of the image IE, the module MRI determines an order of decoding the macroblocks and blocks as a function of that priority data.

In contrast, if the image IE was coded using the FIG. 5 variant, the module MRI does not draw up lists of macroblocks for each cluster. The system of attaching a macroblock to a cluster by a field ML contained in the header data of the macroblock enables the module MRI to take account of this attachment when scanning the image IE to decode the macroblocks successively.

If a decoding order is established by the module MRI in the step D1, the module MRI decodes the macroblocks of the image IE in that order in the step D2; if not, decoding is effected in the usual order for scanning the macroblocks of the image IE.

The free macroblocks of the image IE are decoded in the conventional way using the temporal or spatial prediction indicated in the macroblock header fields MP.

A macroblock or block that is part of a cluster of the image IE is decoded as follows:
  for a parameter to be decoded that corresponds to a characteristic value of the cluster:
    if the data of the macroblock or block contains no value corresponding to the parameter to be decoded, the module MRI assigns this parameter the characteristic value of the cluster;
    if the data of the macroblock or block contains a value corresponding to the parameter to be decoded, the module MRI uses that value to refine the characteristic value of the cluster, for example by adding that value to the characteristic value of the cluster, and assigns the value calculated in this way to the parameter;
  for a parameter to be decoded that does not correspond to a characteristic value of the cluster, the corresponding value contained in the data of the macroblock or block is decoded using the AVC prediction indicated for that block or macroblock.

When a macroblock is part of a plurality of clusters, the module MRI first verifies whether partitioning information is coded for that macroblock, indicating, for each of these clusters, which blocks or sub-blocks of the macroblock are assigned to it. If such information exists, the blocks and sub-blocks assigned to a single cluster are decoded as described above for decoding a macroblock that is part of only one cluster.

If such information is not coded for this macroblock or if some blocks or sub-blocks of the macroblock are assigned to a plurality of clusters, the module MRI examines for them, one macroblock coding parameter at a time, to which parameters it is possible to assign by inheritance a characteristic value of one of these clusters or a refinement of that characteristic value, as described above for decoding a macroblock that is part of only one cluster. When it is possible to assign to a coding parameter by inheritance a plurality of characteristic values of different clusters or a plurality of refinements of characteristic values of different clusters, the module MRI assigns that parameter a combination of these characteristic values or a refinement of that combination, for example, or if there is priority data for the various clusters the module MRI assigns to this coding parameter by inheritance the characteristic value of the highest priority cluster or a refinement of that characteristic value.

When all the macroblocks of the image IE have been decoded, the image reconstruction module MRI supplies at the output of the decoder DEC a decoded image ID corresponding to the image IE.

Figure 8:
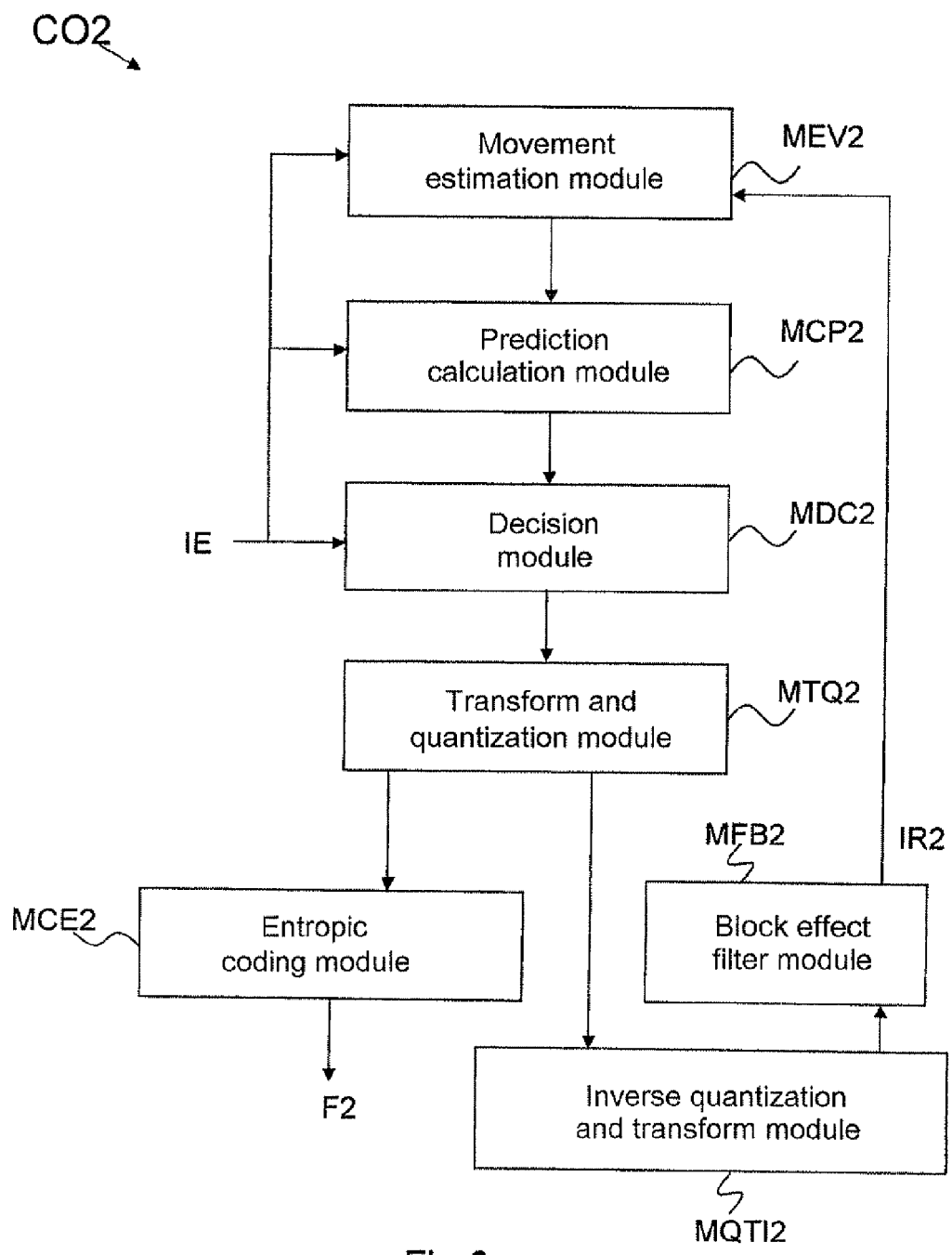
FIG. 8 represents a coding device of a second implementation the invention.

The coding method of the second implementation of the invention is implemented in a coding device CO2 shown in FIG. 8. The steps of the coding method of the second implementation of the invention are the same as in FIG. 1 but are implemented differently, the macroblocks of the image IE being grouped into clusters while coding the "free" macroblocks of the image IE, i.e. those not yet grouped.

Note that this second implementation of the invention is described in less detail than the first implementation because it has many elements in common with the first implementation.

In this second implementation of the invention, the image IE to be coded arrives directly at the input of a movement estimation module MEV2, a prediction calculation module MCP2, and a decision module MDC2. As in the first implementation of the invention, the prediction calculation module MCP2 calculates possible predictions of the macroblocks of the image IE from the image IE or from reference images IR2 constructed from other images of the sequence previously coded by the transform and quantization module MTQ2, decoded by the inverse transform and quantization module MTQI2, and then filtered by the block effect filter module MFB2. These modules MTQ2, MTQI2, and MFB2 function like the modules MTQ1, MTQI1, and MFB1, respectively, of the device CO1.

The predictions calculated by the prediction calculation module MCP2 depend on the type (intra or inter) of image IE:
  If the image IE is an intra image, the prediction module MCP2 calculates possible spatial predictions for each macroblock of the image IE relative to other macroblocks of the image IE.
  If the image IE is an inter image, the module MEV2 calculates the movements between the image IE and one or more reference images IR2. The prediction calculation module MCP2 then calculates possible temporal predictions for each macroblock of the image IE relative to macroblocks of other images of the sequence to be coded and possible spatial predictions for each macroblock of the image IE relative to other macroblocks of the image IE.

Once these predictions have been calculated, the decision module MDC2 then executes the steps C1 to C3 of the coding method of the invention shown in FIG. 1.

The step C1 groups macroblocks of the image IE into clusters. This step uses predictions previously calculated for the macroblocks of the image IE by the module MCP2 that make it possible to determine a representative macroblock for a plurality of other macroblocks that are then grouped in a cluster. In contrast to the first implementation, this representative macroblock is determined using the bit rate vs. distortion criterion and therefore not necessarily using a perceptual criterion.

The next step C2 determines characteristic values of the clusters formed in the step C1. The characteristic values for a given cluster correspond to the coding parameter values of the representative macroblock of the cluster.

The next step C3 codes the characteristic values determined in this way in data structure(s), a data structure being associated with each cluster formed in the step C1, and codes the macroblocks of the clusters formed in the step C1. A cluster is defined by the following information:
  the index of the macroblocks grouped in the cluster;
  the index of the representative macroblock of the cluster;
  for each macroblock of the cluster for which one or more blocks or sub-blocks are not assigned to the cluster, partitioning information defining the blocks and sub-blocks of the macroblock assigned to the cluster;
  where applicable, if the cluster is present in a plurality of consecutive images, cluster time-to-live data equal for example to the number of subsequent images to which the cluster still pertains, data for updating the index of the macroblocks of the cluster relative to the preceding image, and where applicable, if these macroblocks contain blocks or sub-blocks not assigned to the cluster, partitioning information associated with the updated macroblocks;
  if the cluster must be decoded before or after other clusters of macroblocks or before or after the free macroblocks, decoding priority data.

Figure 9:
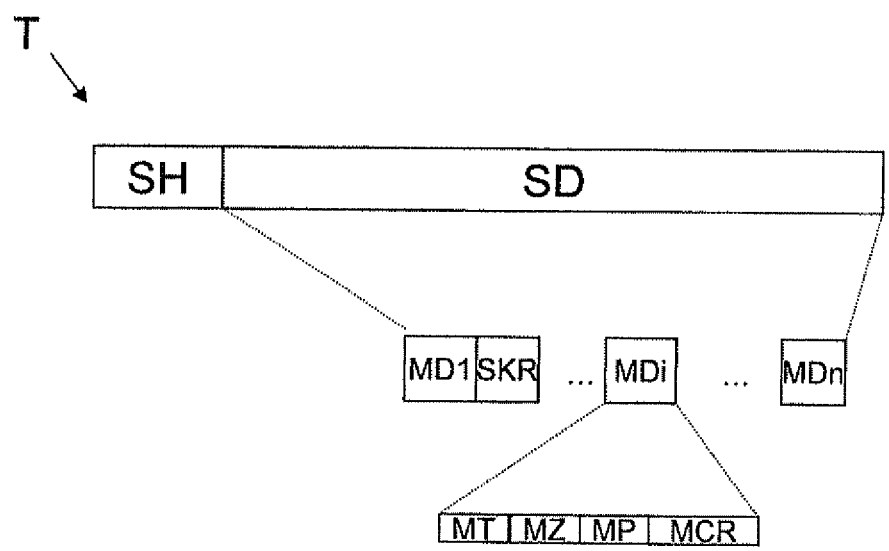
FIG. 9 represents a further way of coding macroblocks of an image coded in accordance with the invention.

In this second implementation, the characteristic values of the cluster are coded with reference to the representative macroblock of the cluster as shown in FIG. 9.

Compared to the FIGS. 4 and 5 coding variants, there is no cluster data field GD. In this implementation the data structure coding the characteristic values of the cluster is the representative macroblock of the cluster. All other cluster data is contained in the macroblock data.

As in the FIGS. 4 and 5 coding variants, the free macroblocks are coded to the H.264/MPEG-4 AVC standard, i.e. each contains a field MT specifying the type (inter or intra) of the macroblock concerned, a field MP indicating the prediction direction used, and a field MCR coding the macroblock residue values or the macroblock non-predicted values if no temporal or spatial prediction is used for the macroblock concerned.

In contrast, the macroblocks coded using the characteristic values of a cluster and the representative macroblock of the cluster each include the following fields:
  a field MT that codes a new macroblock type MB_CLUSTER, indicating that the macroblock concerned is part of a cluster;
  a field MZ that indicates if the macroblock concerned is the representative macroblock of the cluster or not, gives a cluster index, and where applicable gives a time-to-live of the cluster and a decoding priority for the cluster;
  a field MP, present only if the macroblock concerned is the representative macroblock of the cluster, that indicates the prediction used to code the representative macroblock (prediction type and where applicable prediction direction); and
  where applicable, a field MCR coding the prediction residue of the macroblock concerned.

A representative macroblock of a cluster is thus coded according to a prediction as defined in the H.264/MPEG-4 AVC standard, for example a spatial or temporal prediction. Its field MCR codes the predicted values of the macroblock or the non-predicted values if no temporal or spatial prediction is used for the macroblock concerned.

The other macroblocks that are parts of clusters are coded either using the data of those clusters or in the same way as a free macroblock, as a function of the choice that optimizes the bit rate vs. distortion criterion.

When the module MDC2 uses the data of a cluster to code a macroblock, it uses the initial, i.e. non-predicted, values of the representative macroblock of the cluster to code the field MCR of the macroblock. To be more precise, the value of a parameter contained in this field MCR is either not coded or equal to the difference between the corresponding initial value of the representative macroblock of the cluster and the corresponding initial value of the macroblock to be coded. If this value is not coded, it is in fact coded implicitly by inheriting the corresponding initial value from the representative macroblock of the cluster.

Once the decision module MDC2 has effected this structural coding, the coefficients corresponding to the blocks of the image IE are sent to the transform and quantization module MTQ2 that applies a discrete cosine transform followed by quantization. The macroblock slices with these quantized coefficients are then sent to the entropic coding module MCE2 to produce, with the other images of the video sequence already coded in the same way as the image IE, a video bitstream F2 coded in accordance with the invention.

The bitstream F2 coded in this way is sent to a remote terminal via a communications network. This terminal includes a decoder of the invention that has the same structure as the decoder DEC of the first implementation, but compared to that decoder DEC its image reconstruction module functions differently, as it effects decoding corresponding to coding that is the inverse of that effected by the module MDC2. This decoding in accordance with the invention is effected in the two decoding steps D1 and D2 shown in FIG. 7.

In the step D1 the image reconstruction module decodes data structures of clusters coded in the slices of macroblocks of the image IE. The image reconstruction module scans the macroblocks contained in the stream F2 to identify the representative macroblocks of the clusters, each of these representative macroblocks identifying a cluster. During this scanning it also identifies macroblocks coded using data from the clusters and decodes the fields MZ associated with the macroblocks of the clusters in order to determine a decoding order, where applicable taking account of any priority data included in the fields MZ.

If temporal or spatial prediction is indicated in the field MP of the representative macroblock, in this step D1 the image reconstruction module also decodes each representative macroblock of a cluster previously identified, where applicable using prediction data calculated while coding preceding images.

The values contained in the fields MCR of these representative macroblocks serve as references for subsequent decoding of the other MB_CLUSTER macroblocks.

In the step D2 the image reconstruction module decodes other macroblocks of the stream F2 in the decoding order established in the step D1.

The macroblocks of the stream F2 having a field MT indicating an intra or inter macroblock are decoded in the conventional way using the type of prediction indicated in the macroblock header fields MP.

A macroblock of a cluster that is not the representative macroblock of the cluster, having its field MT equal to MB_CLUSTER, is decoded in the following manner:
  if the data in the field MCR of the macroblock contains no value corresponding to the parameter to be decoded, the image reconstruction module assigns this parameter the corresponding previously decoded value of the representative macroblock of the structure;
  if the data in the field MCR of the macroblock contains a value corresponding to this parameter to be decoded, the image reconstruction module uses this value to calculate a refinement of the corresponding previously decoded value of the macroblock representative of the cluster and assigns the value calculated in this way to the parameter.

The coding method of a third implementation of the invention is implemented in a coding device similar to the device CO1 from FIG. 2 but in which the cluster grouping module detects homogenous movement of macroblocks of the image IE relative to a preceding image, for example movement of the cluster G1. This homogeneous movement of macroblocks is either modeled by the cluster grouping module using a vector V shown in FIG. 10 or coded otherwise than by a single vector, for example parametrically.

In this third implementation, using data from the cluster G1, it is movement data that is pooled, not texture data. Moreover, the coding method of this third implementation of the invention comprises the same steps as shown in FIG. 1 and is therefore described in less detail than in the first implementation, as these steps have many elements in common with the first implementation.

In the first step C1, the cluster grouping module groups into clusters sets of macroblocks having a homogeneous movement, here the macroblocks of the cluster C1, using movement estimation techniques similar to those used by the movement estimation module MEV1.

The next step C2 determines one or more movement characteristic values of the cluster G1. Here the cluster grouping module averages the movement vectors associated with the movements of the macroblocks of the cluster G1 from the image IP to the image IE, resulting in a movement characteristic vector V.

At the end of the step C2, the cluster grouping module sends the image IE and the information defining the cluster G1 to the prediction calculation and decision modules of the coder used in this third implementation. The information defining the cluster G1 consists of:
  the index of the macroblocks grouped in this cluster; and
  the values of the movement characteristic vector V corresponding to two AVC type parameters for coding a movement vector.

Alternatively, as in the first and second implementations, the cluster G1 is assigned a time-to-live, or decoding priority data or partitioning information if some blocks of a macroblock of the cluster G1 are not assigned to the cluster G1. In this variant, a temporal prediction for coding the movement characteristic vector of the cluster G1 may therefore be envisaged.

In the next step C3 the decision module codes the characteristic vector V of the cluster G1 in a data structure associated with the cluster G1 and codes the macroblocks of the image IE in a similar way to coding any movement vector of a macroblock in the H.264/MPEG-4 AVC format.

The data from the cluster G1 and the macroblocks of the image IE are coded in a similar way to either the FIG. 4 or the FIG. 5 variant.

In the FIG. 4 variant in particular, the data structure associated with the cluster G1 comprises data G1D and pointers P11, P12, and P13 each of which points to a macroblock of the cluster G1, and the data G1D includes a field GM containing the coded movement characteristic vector V of the cluster. In the FIG. 5 variant, the data G1D further includes a cluster index field G1 and the data structures associated with each of the clusters contain no pointers to the macroblocks of the clusters, the fact that a macroblock is part of a cluster being indicated otherwise, by using a coded field ML in each macroblock.

According to a bit rate vs. distortion criterion, the decision module codes the free macroblocks of the image IE using the most pertinent AVC prediction and the macroblocks of the cluster G1 either as free macroblocks or using the data associated with the cluster G1.

Under such circumstances, when the FIG. 4 coding variant is used, a macroblock of the cluster G1 includes only one field, namely the field MCR, which is present when a residue is coded to refine the movement characteristic vector V of the cluster or where a residue is coded to refine the texture of the macroblock relative to its texture obtained by movement compensation using the characteristic vector V, possibly refined.

In contrast, if the FIG. 5 variant is used, this macroblock includes the following fields:
  a field MT corresponding to a new type of macroblock, for example MB_CLUSTER, indicating that it is part of a cluster;
  a new header field ML, which indicates the cluster of which the macroblock is part; and
  a field MCR that is present if a residue is coded to refine the movement characteristic vector V of the cluster or if a residue is coded to refine the texture of the macroblock relative to the texture obtained by movement compensation using the characteristic vector V, possibly refined.

Note that a macroblock of the MB_CLUSTER type has no field MP because this implementation does not use temporal prediction for coding the cluster data.

In each of these variants, the field MCR of a macroblock using data from the cluster G1 is coded as follows:
  the value of the movement vector calculated beforehand for this macroblock by the movement estimation module of the coder is not coded or only the difference between that value and the value of the movement characteristic vector V of the cluster is coded; and
  the values of the other coding parameters of the macroblock, for example characterizing its texture, are not coded or only the difference between the corresponding values obtained by movement compensation using the movement vector of the macroblock calculated beforehand by the movement estimation module are coded.

Figure 10:
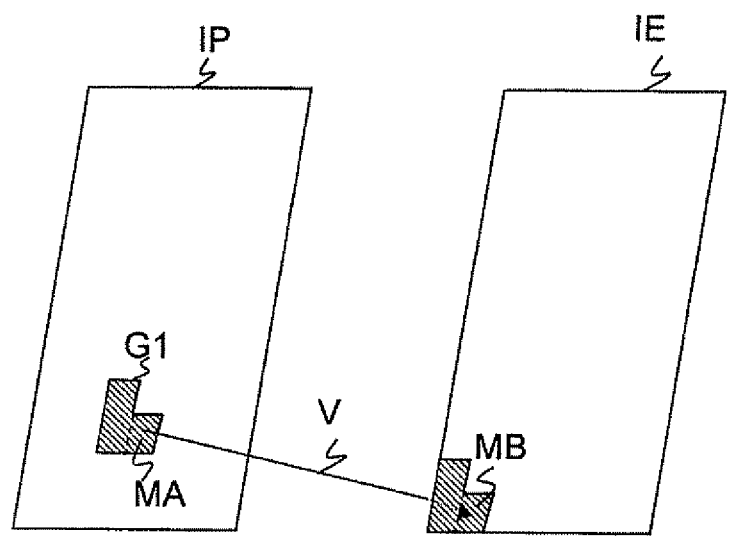
FIG. 10 represents a movement vector associated with the movement of a cluster of macroblocks in an image coded in accordance with the invention.

In FIG. 10, for example, if the macroblock MB is considered to correspond more or less to the macroblock MA of the preceding image IP and the movement vector between the macroblock MB and the macroblock MA corresponds to the movement characteristic vector V of the cluster, then the field MCR of the macroblock MB:
  does not contain a value corresponding to the movement vector parameter, that value being coded implicitly as equal to the value of the movement characteristic vector V of the cluster; and
  does contain texture residue values corresponding to texture differences between the macroblock MB and the macroblock MA.

Once this structural coding has been effected by the decision module, discrete cosine transform and then quantization are then applied to any residue coefficients corresponding to the blocks of the image IE. The slices of macroblocks with quantized coefficients then undergo entropic coding to produce a video bitstream coded in accordance with the invention.

This video bitstream is then decoded by a decoder of the invention effecting operations that are the inverse of those effected by the coder of the invention and in a similar manner to the decoding methods described above for the other implementations of the invention.

Note that other implementations and other coding and decoding variants for implementing the coding method and the decoding method of the invention may be envisaged. Moreover, diverse coding syntaxes are possible. For example, data from clusters having similar characteristic values is pooled in a data structure that is associated with the clusters and is used to decode data structures individually associated with each of these clusters.

An exemplary embodiment aims to solve the drawbacks of the prior art by providing image coding and decoding methods and devices in which data specific to each block or macroblock, such as texture or color data, is pooled between blocks or macroblocks having a similar texture or color.

Thus the advantages of pooling information in regional coding methods are obtained without the drawback of fine segmentation requiring the transmission of a segmentation map.

Although the present disclosure has been described with reference to one or more examples, workers skilled in the art will recognize that changes may be made in form and detail without departing from the scope of the disclosure and/or the appended claims.

The invention claimed is:

1. A coding method comprising:
  coding, by a coding device, at least one image or at least one image of a sequence of images, including grouping pixels of the at least one image into a plurality of blocks and generating a data stream that includes data representative of said blocks, wherein coding comprises:
  grouping at least some of the plurality of blocks in a cluster of blocks according to proximity of their respective values of texture parameter to be coded;
  determining a value characteristic of said cluster of blocks as a function of a respective value of at least one texture parameter to be coded of at least one block of said cluster of blocks;
  coding each of the blocks of said cluster, where the values of texture parameter of said blocks are coded implicitly by inheritance of said characteristic value; and
  coding a data structure associated with said cluster of blocks, said data structure including data associated with said characteristic value.

2. The coding method according to claim 1, wherein the texture parameter to be coded of the at least one block corresponds to an orientation of the texture of said block.

3. The coding method according to claim 1, wherein the texture parameter to be coded of the at least one block corresponds to an orientation of a texture contour that passes through said at least one block.

4. The coding method according to claim 1, wherein said data structure associated with said cluster of blocks contains partitioning data having a first value or a second value according to whether a block of said at least one image is in said cluster or not.

5. The coding method according to claim 1, wherein in the block grouping step at least one sub-block of one of the blocks grouped in this way is not assigned to said cluster of blocks, and said step of coding the blocks of said cluster comprises coding partitioning information for said at least one block, which indicates the sub-blocks of said block assigned to said cluster, in said data structure or in said block during said step of coding blocks of said cluster.

6. The coding method according to claim 5, wherein coding said partitioning information comprising associating a flag with each sub-block of said block indicating whether each sub-block is assigned to said cluster or not.

7. A method comprising:
decoding, by a decoding device, a data stream representative of at least one image or at least one image of a sequence of images, said stream including data representative of pixel groups, referred to as blocks, in the at least one image, and a data structure associated with a set of said blocks referred to as a cluster of blocks, wherein decoding comprises:
decoding the data structure associated with the cluster of blocks, in which said blocks of said cluster have been grouped according to proximity of their respective values of texture parameter, and decoding at least one characteristic value of said cluster, said characteristic value corresponding to a function of a respective value of at least one texture parameter of at least one block of said cluster; and
decoding each of the blocks of said cluster, assigning to said block texture parameter said characteristic value if said block texture parameter is not coded for said block.

8. The decoding method according to claim 7, wherein the texture parameter of said at least one block corresponds to an orientation of the texture of said block.

9. The decoding method according to claim 7, wherein the texture parameter of the at least one block corresponds to an orientation of a texture contour that passes through said at least one block.

10. The decoding method according to claim 7, wherein during the decoding of said data structure, partitioning data is read, said partitioning data having a first value or a second value according to whether a block of said at least one image is in said cluster or not.

11. The decoding method according to claim 7, wherein when the block to be decoded contains sub-blocks not assigned to said cluster and sub-blocks assigned to said cluster, said step of decoding said block is preceded by a step of decoding partitioning information for said block determining said sub-blocks of said block assigned to said cluster and during said step of decoding said block, the sub-blocks of said block not assigned to said cluster are decoded without using said characteristic value.

12. The decoding method according to claim 11, wherein decoding said partitioning information comprises reading a flag associated with each sub-block of said block indicating whether each sub-block is assigned to said cluster or not.

13. The decoding method according to claim 7, wherein the steps of decoding the data structure and decoding each of the blocks of the cluster permit at least one of the blocks in the cluster to be separated from and not adjoining others of the blocks in the cluster within the at least one image.

14. A method comprising:
receiving with a decoding device a signal from a communication network, said signal carrying a data stream representative of at least one image or at least one image of a sequence of images, wherein said stream includes data representative of pixel groups, referred to as blocks, in the at least one image, and a data structure associated with a set of said blocks referred to as a cluster of blocks;
decoding, with said decoding device, the data structure associated with the set of said blocks, in which said blocks of said cluster have been grouped according to proximity of their respective values of texture parameter, and decoding at least one characteristic value of said cluster, said characteristic value corresponding to a function of a respective value of at least one texture parameter of at least one block of said cluster; and
decoding each of the blocks of said cluster, assigning to said block texture parameter said characteristic value.

15. A device for coding at least one image or at least one image of a sequence of images generating a data stream including data representative of pixel groups, referred to as blocks, in the at least one image, the device including:
means for grouping at least some of the blocks into a cluster of blocks according to the proximity of their respective values of texture parameter to be coded;
means for determining a characteristic value of said cluster of blocks as a function of a respective value of at least one texture parameter to be coded of at least one block of said cluster of blocks;
means for coding a data structure associated with said cluster of blocks, said data structure including data associated with said characteristic value; and
means for coding each of the blocks of said cluster, including:
means for implicitly coding values of said blocks for said parameter by inheritance of said characteristic value.

16. A device for decoding a data stream representing at least one image or at least one image of a sequence of images, said stream including data representative of pixel groups, referred to as blocks, in the at least one image, the device comprising:
means for decoding a data structure included in the stream, associated with a set of said blocks referred to as a cluster of said blocks, in which at least some of said blocks have been grouped according to proximity of their respective values of texture parameter, and decoding at least one characteristic value of said cluster of blocks, said characteristic value corresponding to a function of a respective value of at least one texture parameter of at least one block of said cluster; and
means for decoding each of the blocks of said cluster, assigning to said block texture parameter said characteristic value if said block texture parameter is not coded for said block.

17. A non-transitory computer-readable medium comprising a computer program stored thereon and including instructions for executing a method of decoding a data stream representative of at least one image or at least one image of a sequence of images, said data stream including data representative of pixel groups, referred to as blocks, in the at least one image, when the instructions are executed on a computer, wherein the method comprises the following steps performed by a decoding device:
decoding a data structure received in the data stream associated with a set of said blocks referred to as a cluster of blocks, in which said blocks of said cluster have been grouped according to proximity of their respective values of texture parameter, and decoding at least one characteristic value of said cluster of blocks received in the data stream, said characteristic value corresponding to a function of a respective value of at least one texture parameter of at least one block of said cluster; and
decoding each block of said cluster, assigning to said block texture parameter said characteristic value if said block texture parameter is not coded for said block.

* * * * *